United States Patent
Grable et al.

(10) Patent No.: US 6,733,076 B2
(45) Date of Patent: May 11, 2004

(54) SEATBACK RECLINER MECHANISM INCORPORATING FORWARD FOLD FLAT CAPABILITY FROM ANY FORWARD REARWARD RECLINED POSITION

(75) Inventors: David Grable, Clinton Township, MI (US); Keith Brantley, Utica, MI (US)

(73) Assignee: BAE Industies, Inc., Centerline, MI (US)

( * ) Notice: Subject to any disclaimer, the term of this patent is extended or adjusted under 35 U.S.C. 154(b) by 0 days.

(21) Appl. No.: 10/253,462

(22) Filed: Sep. 24, 2002

(65) Prior Publication Data

US 2004/0056523 A1 Mar. 25, 2004

(51) Int. Cl.$^7$ ................................................. B60N 2/22
(52) U.S. Cl. ..................... 297/362; 297/367; 297/378.12
(58) Field of Search ................................. 297/362, 367, 297/378.12, 361.1, 366, 378.1

(56) References Cited

U.S. PATENT DOCUMENTS

| | | | |
|---|---|---|---|
| 3,356,415 A | * 12/1967 | Putsch | 297/378.12 |
| 4,781,415 A | * 11/1988 | Heesch et al. | 297/362 |
| 4,795,213 A | * 1/1989 | Bell | 297/367 |
| 4,986,514 A | * 1/1991 | Ikegaya et al. | 297/362 |
| 5,248,184 A | * 9/1993 | Morris | 297/378.11 |
| 5,435,624 A | * 7/1995 | Bray et al. | 297/362.11 |
| 6,139,104 A | 10/2000 | Brewer | 297/353 |
| 6,161,899 A | * 12/2000 | Yu | 297/378.12 |
| 6,371,558 B1 | 4/2002 | Couasnon | 297/378.1 |
| 6,474,741 B2 | * 11/2002 | Kamida et al. | 297/378.12 |

* cited by examiner

Primary Examiner—Peter R. Brown
(74) Attorney, Agent, or Firm—Gifford, Krass, Groh, Sprinkle, Anderson & Citkowski, P.C.

(57) ABSTRACT

A seatback recliner mechanism incorporated into a vehicle, the seat including a seat bottom and a pivotally engaged seatback. The recliner mechanism includes a pair of lower supports forming a part of the seat bottom and secured to at least one of first and second sides of the seat bottom. A first gear is fixed between the lower support and at a generally upper end and a pair of upper supports are pivotally secured to the lower supports and include a second rotatable gear meshingly engaged with the first gear. The seatback includes an upper arm pivotally secured to the upper support in coaxial fashion relative to a third rotatable gear meshingly engaged with the second gear. A first lever is operative to pivot the upper support relative the lower support over a specified range of forward incline and rearward recline. A second lever is operative to pivot the upper arm, relative to the upper support, to a substantially forward and horizontal position. A third lever unseats and rotates an intermediate plate, disposed between the upper and lower support plates and operatively engaged to the upper support plates in the released position, to a predetermined and forwardly inclined position.

16 Claims, 8 Drawing Sheets

SEATBACK RECLINER MECHANISM INCORPORATING FORWARD FOLD FLAT CAPABILITY FROM ANY FORWARD REARWARD RECLINED POSITION

BACKGROUND OF THE INVENTION

1. Field of the Invention

The present invention relates generally to seatback recliner mechanisms for use in a vehicle. More particularly, the present invention discloses a vehicle seatback recliner mechanism, in particular incorporated into a first row of vehicle seats, and in which the seatback is capable of being pivoted to a forward flat folded condition from any previous and forward or rearward reclined position.

2. Description of the Prior Art

Seatback recliner mechanisms are fairly well known in the art, in particular those incorporated into a vehicle seat. One objective of a seatback recliner mechanism, such as may be particularly located in a forward or first row of seats, is to provide ease of ingress and egress to individuals to be seated in a secondary or rearwardly situated row of seats, as well as the ability to fold the seat in a substantially forwardly and flattened arrangement.

One example of a multiple function seatback adjusting mechanism is set forth in U.S. Pat. No. 6,139,104, issued to Brewer. The seatback mechanism in Brewer provides for recliner adjustment of the seatback, as well as rotation of the seatback to a forward dump easy entry position and rotation of the seatback to a fold flat position for storage. A single actuating handle is operated to adjust the recline position of the seat and to rotate the seatback to the fold flat position. A second handle is actuated to rotate the seatback to the forward dump position in which the seatback is unlocked. Upon return of the seatback from the dump position, the seatback locks in the previously adjusted recline position. A lock out is provided to prevent release of the recliner when the seatback is in the forward dump position.

U.S. Pat. No. 6,371,558, issued to Couasnon, discloses a fold flat vehicle seat having a movable track member slidably engaging a fixed track member. A seat assembly is mounted thereon for longitudinal sliding movement relative the fixed track member. A track lock is operatively interconnected between the movable and fixed track members and between a locked configuration in which the movable track member is precluded from moving longitudinally relative to the fixed track member and a released configuration in which the movable track member is permitted to move longitudinally relative to the fixed track member.

A seatback latch operatively engages between a seat cushion member and a pivotally associated seatback member. A spring biases the seatback member toward a substantially horizontal load supporting position. A link arm is operatively interconnected between the seatback member and fixed track member and causes rearward longitudinal movement of the seatback member relative to the fixed track member to a predetermined longitudinal position as the seatback member is forwardly folded about the seatback pivot axis from the upright occupiable position to the substantially horizontal load supporting position when the track lock is in the released configuration.

SUMMARY OF THE PRESENT INVENTION

The present invention is a vehicle seatback recliner mechanism, in particular incorporated into a first row of vehicle seats, and in which the seatback is capable of being pivoted to a forward flat folded condition from any previous and forward or rearward reclined position. The present invention also provides a vehicle seatback assembly in which ease of ingress and egress is provided to occupants seated to the rear of the seatback recliner mechanism.

At least one and typically a pair of bottom support plates are provided and which form a part of the seat bottom and which are adapted to being secured to at least one of first and second sides of the seat bottom. A first gear is fixed between the lower supports and at a generally upper end location thereof.

At least one and typically a pair of upper support plates are arranged in spaced apart fashion and are further pivotally secured to the lower support plates. A second rotatable gear is sandwiched between the upper plates and is meshingly engaged with the first gear. Also contained between the upper support plates are a cam and pawl arrangement, the pawl including an extending end exhibiting a plurality of teeth.

An intermediate plate arranged in selectively rotatable fashion with respect to the lower support plates, the intermediate plate being arranged substantially coaxial with respect to the first gear and including a plurality of teeth exhibited along an upper and arcuate extending edge. The pawl is pivotally secured to the upper support and so that the teeth disposed on its extending end are biased in interengaging fashion against those associated with the intermediate plate at selected locations along its arcuate extending edge.

A first lever is secured to a forward-most location of the lower support plates and, upon being actuated, unseats the pawl from the intermediate plate and causes the upper support to pivot over a specified range of forward incline and rearward recline. The intermediate plate further includes an arcuate channel defined therethrough and through which is received a pin fixed to the upper support plates.

The seatback further includes an upper arm pivotally secured to the upper support in coaxial fashion relative to a third rotatable gear meshingly engaged with the second gear. A second lever is connected to the upper support plates and, via a second interconnecting cam, unseats the upper arm from the upper support plates, and so that the arm pivots to a substantially forward and horizontal position.

A plurality of teeth extend along an arcuate exterior surface of the upper arm, proximate its pivotal axis. A catch portion associated with the second cam exhibits additional teeth which interengage a selected subplurality of the teeth extending along the arm, in the forward and horizontal position and further dependent upon a pre-existing incline/recline relationship established between the upper and lower supports. By virtue of the fact that the second and third gears rotate in opposite and synchronous manner, along with the upper support assembly, guarantees that a forward stop pin associated with the upper arm contacts an associated and abutting surface of the third gear in any inclined or reclined position of the upper support assembly and in the forward and horizontally disposed position.

A third cam is secured to the lower support plates in selectively engageable fashion with an underside location of the intermediate plate. A third lever is operatively connected to the third cam and, upon actuating, unseats the third cam from the intermediate plate, causing the intermediate plate and upper support to pivot forwardly in unison and to a predetermined inclined position. A second stop pin extends from a selected one of the lower support plates and defines a forward pivoting stop location of intermediate plate.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
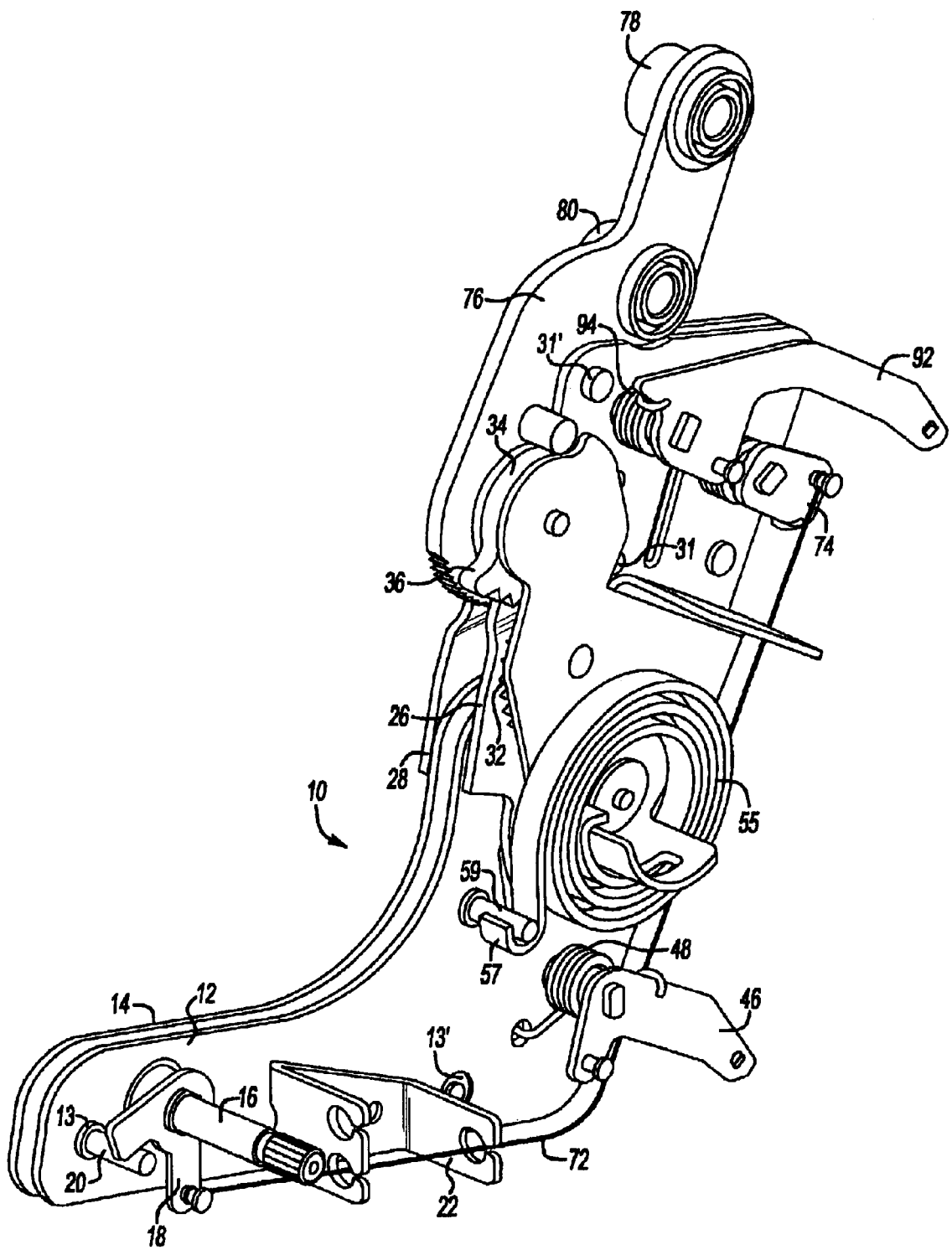
FIG. 1 is a perspective view of the seatback recliner mechanism according to the present invention and in a substantially assembled configuration.

Referring now to FIG. 1, a seatback recliner mechanism is illustrated at 10 in a substantially assembled condition according to an embodiment of the present invention. As previously stated, the seatback is capable of being pivoted to a forward flat folded condition from any previous and forward inclined or rearward reclined position. The present invention also provides a vehicle seatback assembly in which ease of ingress and egress is provided to occupants seated to the rear of the seatback recliner mechanism.

Although not further shown, it is readily understood that the vehicle seat includes a seat bottom and a pivotally engaged seatback. The recliner mechanism includes at least one and preferably a pair of lower supports, such as plates, see at 12 and 14, which form a part of the seat bottom and are adapted to being secured to at least one of first and second sides of the seat bottom.

The supports 12 and 14 are typically steel plates exhibiting a substantially elongated bottom and a partially upwardly and rearwardly inclined back. Furthermore, and again according to the preferred embodiment, the upper support plates are arranged in spaced apart fashion, a plurality of apertures being formed through the support plates and a plurality of spacer pins (see such as at 13, 13' et seq. in FIG. 1) extending through the apertures.

As also shown in FIG. 1, a first lever 16 is provided secured rotatably to a first rotatable cam element 18, in turn secured to an exterior location of a selected lower support (see at 12). A pin 20 extends outwardly from an exterior side of the lower support 12 and defines an abutting stop location of the first rotatable cam element 18. Additional bracketry is illustrated at 22 and is intended for securing the seat to the selected side of the vehicle as previously described.

Figure 2:
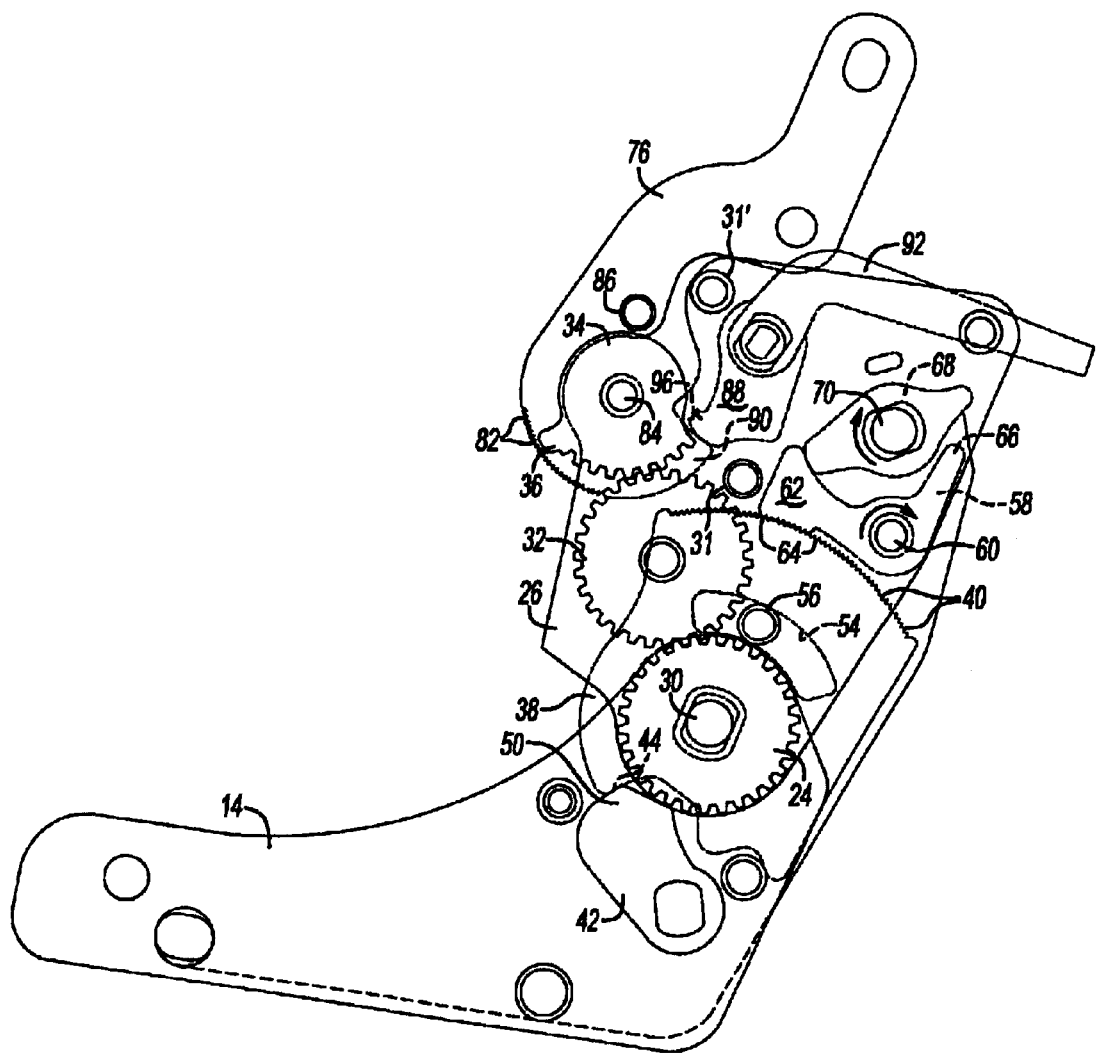
FIG. 2 is a plan view of the seatback recliner mechanism as substantially illustrated in FIG. 1 and showing the arrangement of the primary, secondary and tertiary gears, the pivotal relationship between the seat bottom and upper mechanism, and the arrangement of the upper seatback arm.

FIG. 2 illustrates a plan view of the seatback recliner mechanism, as substantially illustrated in FIG. 1, and in cutaway arrangement in order to better illustrate the inner working components of the recliner mechanism. Specifically, claim 2 illustrates the seatback recliner mechanism in an operative position similar to that shown in FIG. 1. As with FIG. 2, each of the succeeding FIGS. 3–8, are all illustrated in cutaway plan view in order to show a number of different operating positions of the seatback recliner mechanism, as will now be described.

Referring again to FIG. 2, as well as to each of FIGS. 3–8, a first and exteriorly toothed gear 24 is provided and is fixed in sandwiched fashion between the lower supports 12 and 14 and at a generally upper end location. In the preferred embodiment, the first gear 24 is fixed in position to the supports 12 and 14.

At least one and preferably a pair of upper support 26 and 28 are provided (see again FIG. 1). The upper supports 26 and 28 are pivotally secured to the outer faces of the lower supports 12 and 14, about an axis 30 consistent with that of the first gear 24. As with the lower supports 12 and 14, the upper supports 26 and 28 are provided as a pair of support plates arranged in spaced apart fashion, with a plurality of apertures formed therethrough which receive spacer pins (such as for example at 31 and 31' in FIGS. 2–8) extending through the apertures.

As further illustrated in each of FIGS. 2–8, located on an exterior facing surface of a selected one 26 of the upper supports are a plurality of components, including among them a second gear 32 rotatably and meshingly engaged with the first gear 24, a third gear 34 in turn rotatably and meshingly engaged with the second gear 32. The third gear 34 includes a lesser plurality of exteriorly facing toothed portions, only about approximately one-half of its circumference, and further includes a projecting portion 36.

An intermediate plate 38 is arranged in selectively rotatable fashion with respect to the lower supports 12 and 14, the plate 38 being arranged in substantially coaxial and pivotable fashion with respect to the first gear 24 and its axis point 30. The intermediate plate 38 includes a plurality of teeth 40 exhibited along an upper and arcuate extending edge. A cam 42 is secured between the lower supports 12 and 14 and includes an extending portion which is in selectively engageable fashion with an underside (and recessed) location 44 of the intermediate plate 38.

A lever 46 which is spring loaded 48 in a clockwise direction (see again FIG. 1) biases the extending portion, see at 50, of the cam 42 against and within the recessed location 44 of the intermediate plate underside. As viewed in FIG. 5, and upon actuating the lever 46 (FIG. 1), the extending portion 50 of the cam 42 is caused to rotate in a counterclockwise fashion and thus unseat from the recessed location 44 of the intermediate plate 38, thus causing both the plate 38 and the upper support plates 26 and 28 pivot in unison to a forwardly inclined position, such as in particular to 18° forwardly of a vertical axis running through the upper supports (see arrow 52 in FIG. 5). The particular advantage and feature of this lever 46 and mechanism is to facilitate ease of ingress and egress to individuals, such as who are seated in a succeeding and rearwardly disposed row of seats behind a forwardly located seat within which the seatback recliner mechanism 10 is installed.

Figure 3:
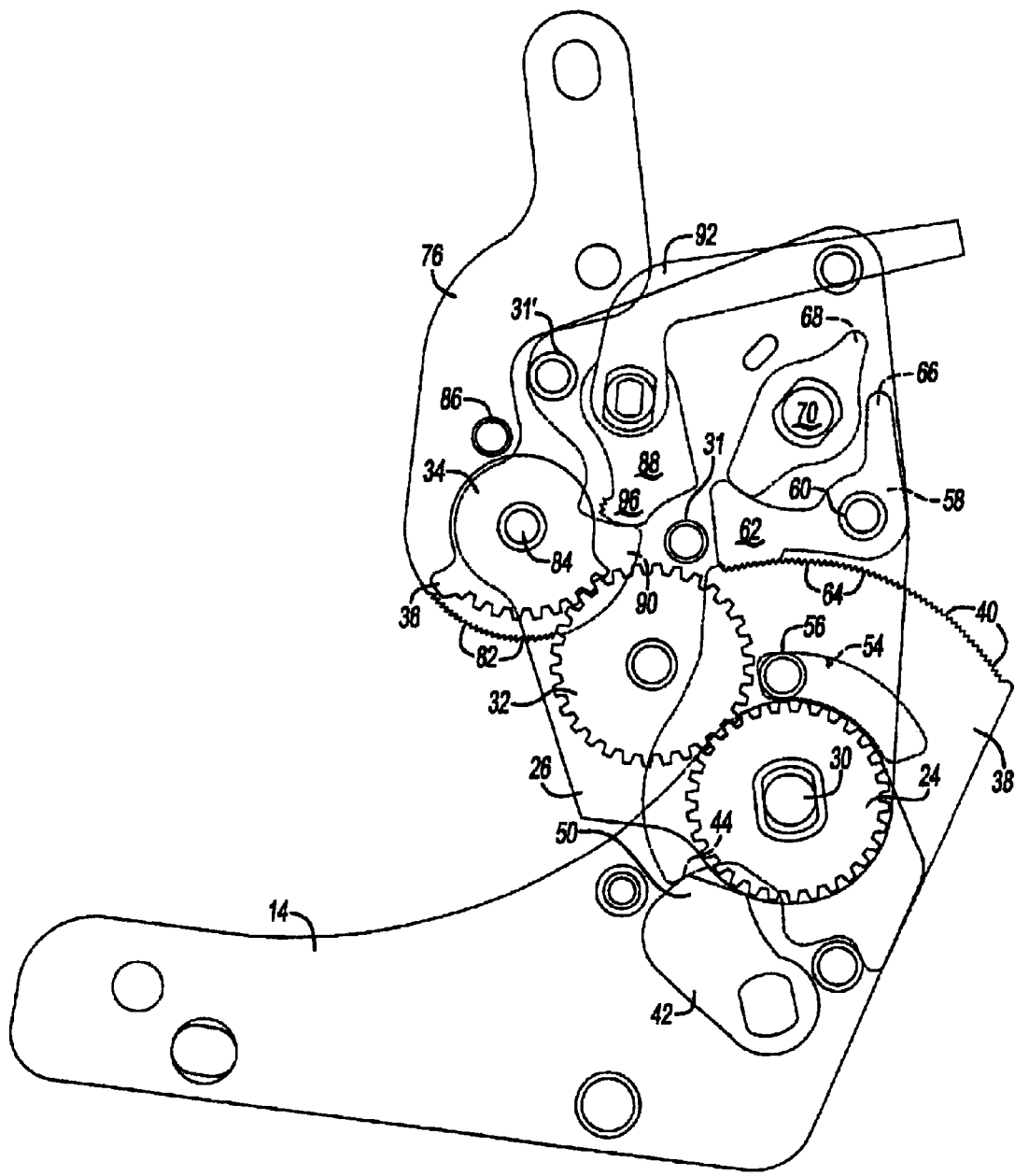
FIG. 3 is a succeeding plan view and which illustrates the seatback recliner mechanism in a fully forward inclined position.
Figure 4:
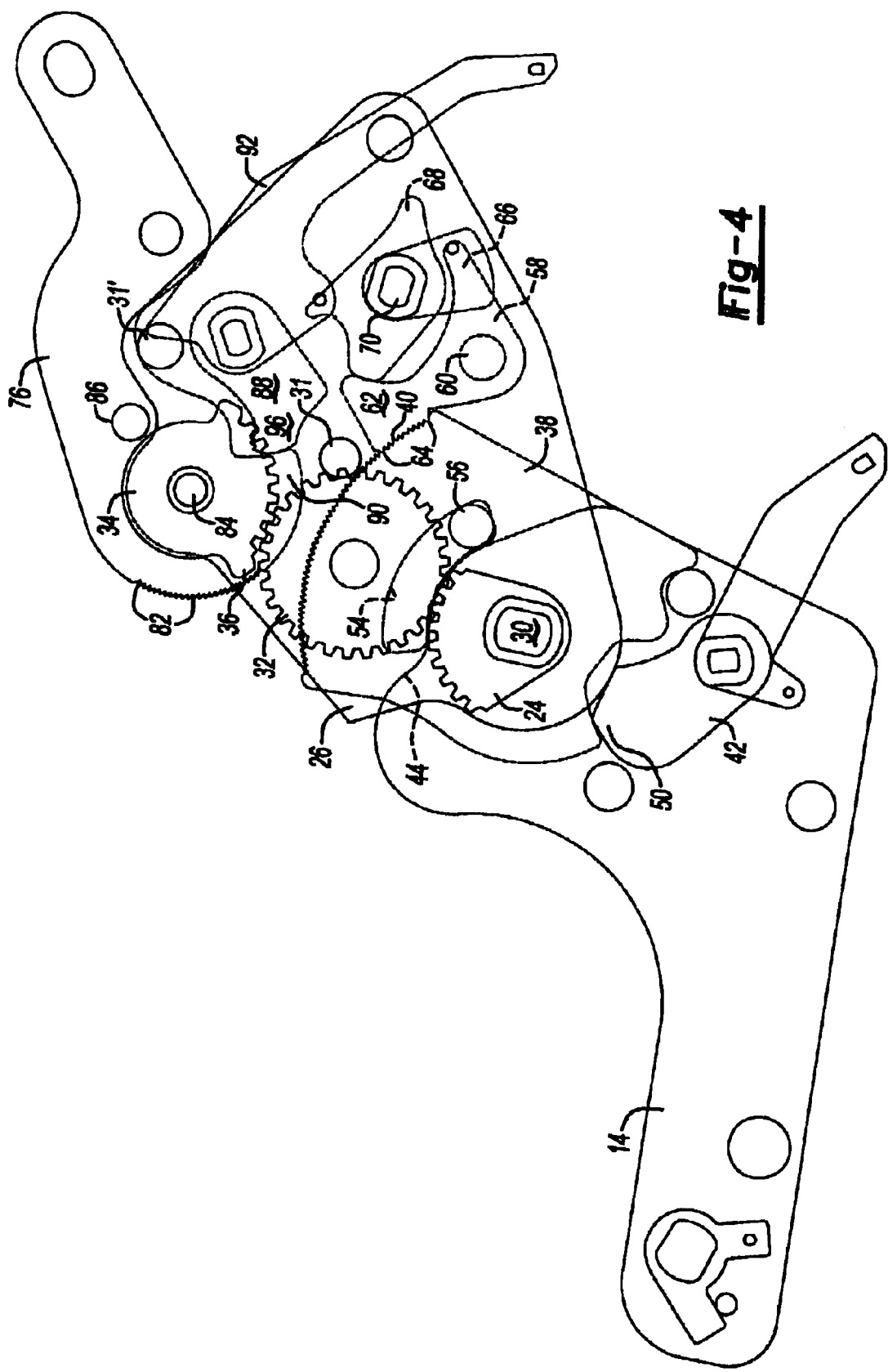
FIG. 4 is a yet further plan view and which illustrates the seatback recliner mechanism in a fully rearward reclined position.
Figure 5:
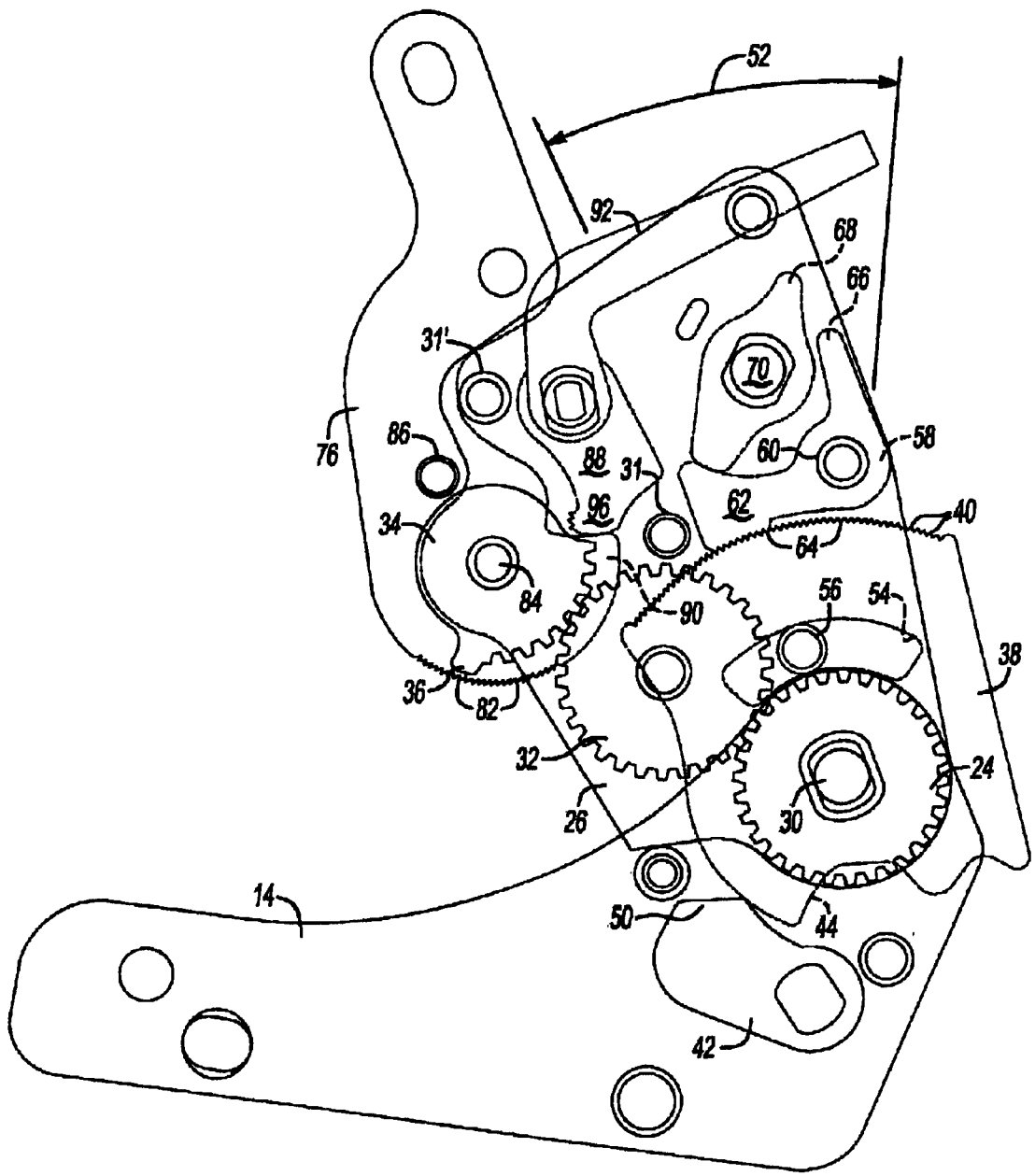
FIG. 5 is a plan view of the seatback recliner mechanism in which the upper mechanism is released and pivoted forwardly in order to facilitate ease of ingress or egress to passengers seated in a rearwardly disposed row of seats.

Additional features interrelating the intermediate plate 38 with the sandwiching and upper supports 26 and 28 include an arcuate channel 54 defined through the intermediate plate 38 and through which is received a pin 56 extending between the support plates 26 and 28 (see again FIGS. 2–8). In operation of the pivoting of the upper supports 26 and 28, relative to the fixed position of the intermediate plate 38, the pin 56 slides along the channel 54 in various and forwardly inclined (typically up to 24° forward of a vertical axis and as shown in FIG. 3) and rearwardly reclined (typically up to 39° rearwardly of a vertical axis and as shown in FIG. 4) and to define the range of motion of the upper supports relative to the lower supports. As also shown in FIG. 1, a large coil spring 55 is provided and includes an end 57 abuttingly supported against a stop tab 59, the spring 55 causing both the upper supports 26 and 28, as well as the intermediately positioned plate 38, to be biased in a forward inclining direction.

A pawl 58 is pivotally secured between the spaced apart and sandwiching upper supports 26 and 28 (see at 60). The pawl 58 includes a forward extending end 62 exhibiting a plurality of teeth 64 which are biased, in interengaging fashion and at selected locations along its arcuate extending edge, against the plurality of teeth 40 associated with the intermediate plate 38. The rotatable pawl 58 further includes a rearward and upwardly extending end 66.

A rotatable cam 68 is provided in operative communication with the pawl 58 and, such as upon being rotated in a clockwise direction about a pivot axis 70, contacts the rearward extending end 66 and causes the teeth 64 disposed at the forward extending end to biasingly unseat from against those associated teeth 40 along a selected and arcuate location of the intermediate plate upper edge. The cam 68 is caused to rotate to its unseating location through the action of a cable 72 extending from the forwardly disposed and rotatable cam element 18 (see again FIG. 1), such cable causing a further spring biasing element (see at 74 again in FIG. 1) to pivotally actuate the cam 68.

The seatback (again not illustrated) further includes an upper arm 76 pivotally secured in sandwiched fashion between the upper supports 26 and 28, the upper arm 76 further including a lower rotatable (pivot) location which is arranged substantially coaxial relative to the third meshingly engaged and rotatable gear 34. As best shown in FIG. 1, the upper arm 76 includes additional features such as cup style spacers 78 and 80 extending from upper extending end locations thereof and to facilitate securing the arm to the vehicle seatback.

With reference also to FIGS. 2–8, the support arm 76 further includes a plurality of teeth 82 extending along its bottom extending arcuate exterior surface, and proximate its pivot axis 84 (see also third gear 34). A forward stop pin 86 projects from a location of the upper arm 76 and in an arcuate path location which is consistent with the placement of the projecting portion 36 of the third gear 34.

A further cam member 88 is secured to the upper support in selectively engageable fashion with a stepped portion 90 of the upper arm 76. A lever 92 is operatively connected to the cam member 88, see also spring loaded portion 94 in FIG. 1 and, upon actuating, causes a projecting end portion 96 of the cam member 88 to unseat from the arm, causing the arm to pivot to a forward and horizontal position.

The projecting end portion 96 of the cam member 88 further defines a catch portion exhibiting additional teeth which, upon rotation of the arm 76 to the forward and horizontal folded position (see FIGS. 6, 7 and 8) interengage a selected subplurality of the teeth 82 extending along the arm 76, in said forward and horizontal position and further dependent upon a preexisting incline/recline relationship established between said upper and lower supports and by further virtue of the stop pin 86 of the arm abutting the projecting portion 36 of the third gear 34.

Figure 6:
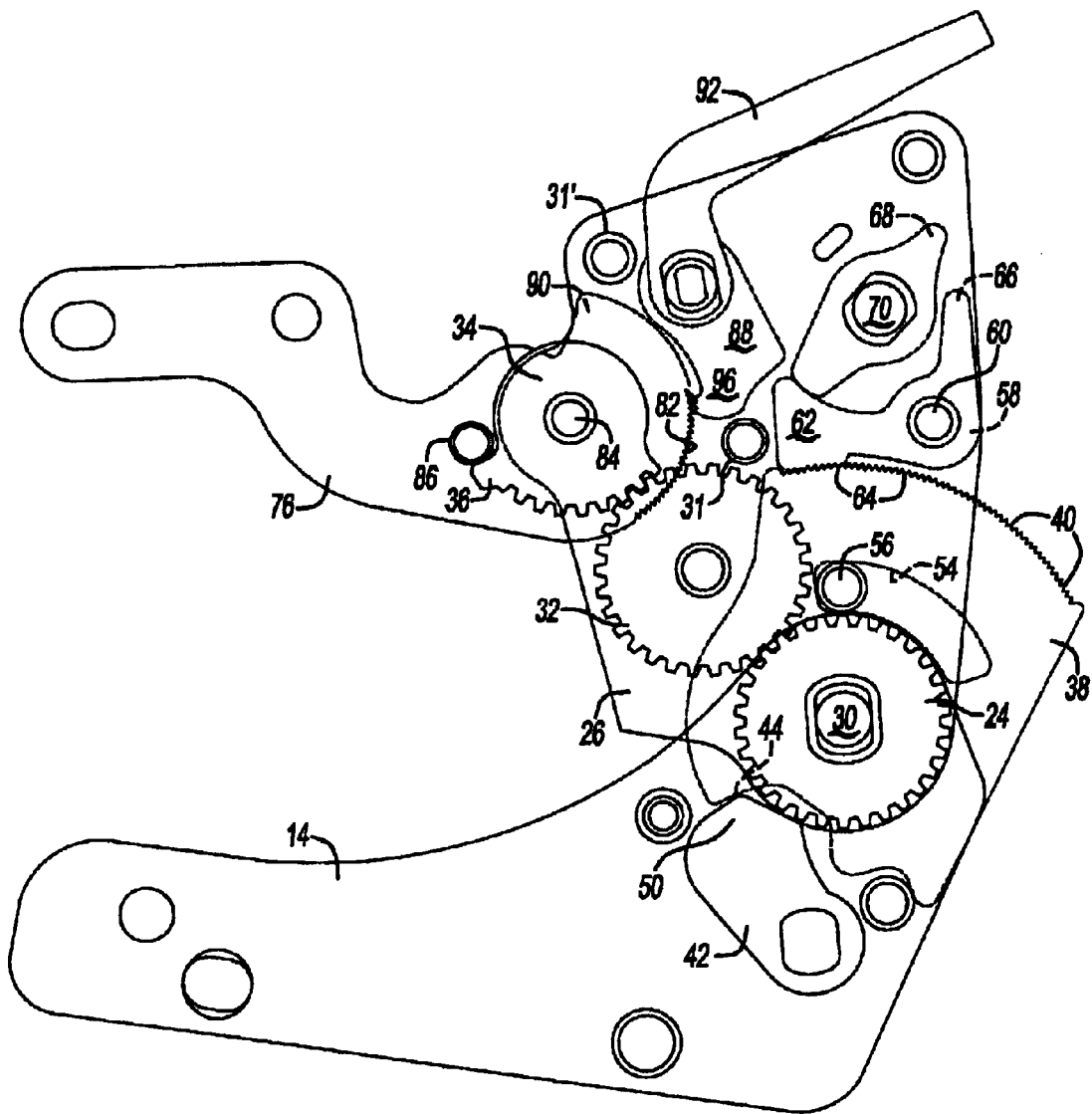
FIG. 6 is a plan view of the seatback recliner mechanism, in which the upper mechanism is established in a fully forward inclined position as in FIG. 3, and further in which the upper seatback arm is folded forwardly.
Figure 7:
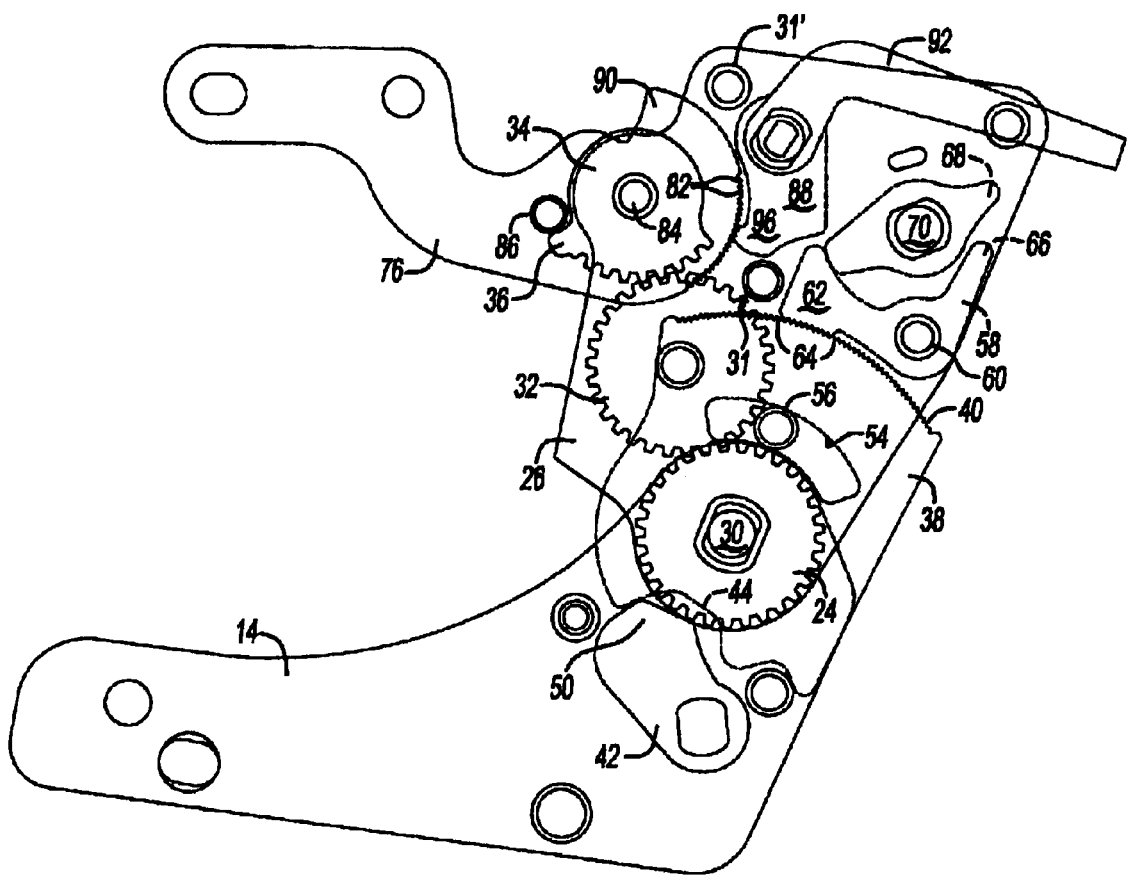
FIG. 7 is a plan view of the seatback recliner mechanism, in which the upper mechanism is established in the pivotal orientation of FIG. 2, and further in which the upper seatback arm is folded forwardly.
Figure 8:
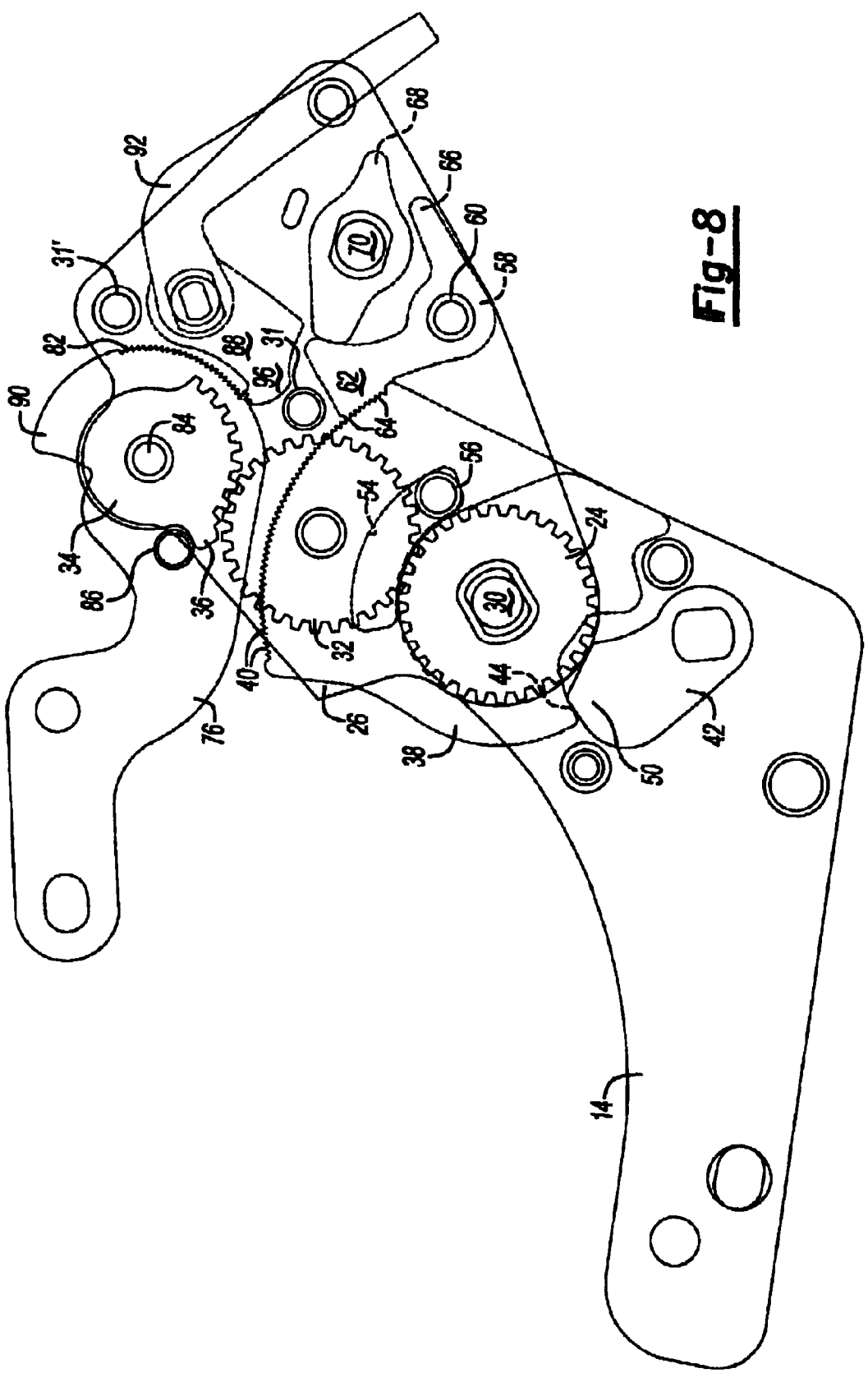
FIG. 8 is a yet further plan view, again illustrating the upper seatback arm in a forwardly folded orientation, and with the upper mechanism established in a fully reclined position according to the present invention.

It is therefore well illustrated from FIGS. 6–8 the manner in which the upper arm 76 is capable of folding in the forward flat position, regardless of the relative incline or recline of the upper supports 26 and 28 relative to the lower supports 12 and 14. This is in large part due to the feature of the second 32 and third 34 gears rotating in synchronization with the forward/rearward pivoting of the upper supports and which maintains the projecting portion 36 of the third gear 34 at a constant relationship with the fold flat position.

Having described our invention, additional preferred embodiments will become apparent to those skilled in the art to which it pertains, and without deviating from the scope of the appended claims.

We claim:

1. A seatback recliner mechanism incorporated into a vehicle, the seat including a seat bottom and a pivotally engaged seatback, said recliner mechanism comprising:

at least one lower support forming a part of the seat bottom and adapted to be secured to at least one of first and second sides of the seat bottom;

a first gear secured to said lower support and at a generally upper end location of said lower support;

at least one upper support pivotally secured to said lower support and including a second rotatable gear meshingly engaged with said first gear;

the seatback including an upper arm pivotally secured to said upper support in coaxial fashion relative to a third rotatable gear meshingly engaged with said second gear;

a first lever operative to pivot said upper support relative said lower support over a specified range of forward incline and rearward recline; and a second lever operative to pivot said upper arm, relative to said upper support, to a substantially forward and horizontal position.

2. The seatback recliner mechanism as described in claim 1, further comprising an intermediate plate arranged in selectively rotatable fashion with respect to said lower support, said plate being arranged substantially coaxial with respect to said first gear and including a first plurality of teeth exhibiting along an upper and arcuate extending edge.

3. The seatback recliner mechanism as described in claim 2, further comprising a pawl pivotally secured to said upper support, said pawl including an extending end with a second plurality of teeth and being biased in interengaging fashion against said first plurality of teeth associated with said plate at selected locations along its arcuate extending edge.

4. The seatback recliner mechanism as described in claim 3, further comprising a first rotatable cam connected to said upper support and operable, through actuation of said first lever to unseat said pawl from said intermediate plate.

5. The seatback recliner mechanism as described in claim 4, further comprising said first lever securing to a forwardmost location of said lower support, a cable extending from said first lever to said rotatable cam.

6. The seatback recliner mechanism as described in claim 4, further comprising a second cam secured to said upper support in selectively engageable fashion with a stepped portion of said upper arm, said second lever operatively connected to said second cam and, upon actuating, causing said second cam to unseat from said arm and causing said arm to pivot to said forward and horizontal position.

7. The seatback recliner mechanism as described in claim 6, further comprising a plurality of teeth extending along an arcuate exterior surface of said upper arm proximate its pivotal axis, a catch portion of said second cam exhibiting additional teeth which interengage a selected subplurality of said teeth extending along said arm, in said forward and horizontal position and further dependent upon a preexisting incline/recline relationship established between said upper and lower supports.

8. The seatback recliner mechanism as described in claim 6, said at least one upper support further comprising a pair of upper support plates arranged in spaced apart fashion, a plurality of apertures being formed through said support plates, a plurality of spacer pins extending through said apertures for maintaining said upper support plates in spaced apart fashion.

9. The seatback recliner mechanism as described in claim 4, said at least one lower support further comprising a pair of support plates arranged in spaced apart fashion, a plurality of apertures being formed through said support plates, a plurality of spacer pins extending through said apertures and sandwiching therebetween said first gear and said intermediate plate.

10. The seatback recliner mechanism as described in claim 2, said intermediate plate further comprising an arcuate channel defined therethrough and through which is received a pin fixed to said upper supports.

11. The seatback recliner mechanism as described in claim 2, further comprising a third cam secured to said lower support in selectively engageable fashion with an underside location of said intermediate plate, a third lever operatively connected to said third cam and, upon actuating, unseating said third cam from said intermediate plate and causing said intermediate plate and said upper support to pivot forwardly in unison to a predetermined inclined position.

12. The seatback recliner mechanism as described in claim 11, further comprising a second stop pin extending from said lower support and defining a forward pivoting stop location of said intermediate plate.

13. The seatback recliner mechanism as described in claim 1, further comprising a forward stop pin projecting from said upper arm and, upon actuation of said second lever, abutting against a projecting portion of said third gear.

14. The seatback recliner mechanism as described in claim 1, further comprising a coil spring for biasing said upper support in a forward pivoting direction relative to said lower support.

15. The seatback recliner mechanism as described in claim 1, further comprising said upper support pivoting over a forward incline range extending up to 24° and a rearward recline range extending up to 39° relative to a vertical axis extending therethrough.

16. A seatback recliner mechanism incorporated into a vehicle, the seat including a seat bottom and a pivotally engaged seatback, said recliner mechanism comprising:

a pair of lower support plates arranged in spaced apart fashion and forming a part of the seat bottom, said lower support plates adapted to being secured to at least one of first and second sides of the seat bottom;

a first gear secured between said lower support plates and at a generally upper end location of said support plates;

an intermediate plate arranged in selectively rotatable fashion with respect to said lower support plates, said intermediate plate being arranged substantially coaxial with respect to said first gear and including a first plurality of teeth exhibiting along an upper and arcuate extending edge;

a pair of upper support plates arranged in spaced apart fashion, said upper plates pivotally secured to said lower support plates and including a second rotatable gear meshingly engaged with said first gear, a pawl pivotally secured to said upper support plates and including an extending end with a second plurality of teeth and being biased in interengaging fashion against said first plurality of teeth associated with said intermediate plate at selected locations along its arcuate extending edge;

the seatback including an upper arm pivotally secured between said upper support plates in coaxial fashion relative to a third rotatable gear meshingly engaged with said second gear;

a first lever operative to pivot said upper support plates relative said lower support plates over a specified range of forward incline and rearward recline;

a second lever operative to pivot said upper arm, relative to said upper supports, to a substantially forward and horizontal position; and a third lever for unseating and rotating said intermediate plate and said upper support plates, relative to said lower support plates, to a predetermined and forwardly inclined position.

* * * * *